US010880268B2

(12) United States Patent
Kenyan et al.

(10) Patent No.: US 10,880,268 B2
(45) Date of Patent: Dec. 29, 2020

(54) DECRYPTING TRANSPORT LAYER SECURITY TRAFFIC WITHOUT MAN-IN-THE-MIDDLE PROXY

(71) Applicant: McAfee, LLC, Santa Clara, CA (US)

(72) Inventors: Manikandan Kenyan, Saratoga, CA (US); Shelendra Sharma, San Jose, CA (US); Anil Abraham, Bangalore (IN)

(73) Assignee: MCAFEE, LLC, Santa Clara, CA (US)

( * ) Notice: Subject to any disclaimer, the term of this patent is extended or adjusted under 35 U.S.C. 154(b) by 264 days.

(21) Appl. No.: 15/946,597

(22) Filed: Apr. 5, 2018

(65) Prior Publication Data

US 2019/0199683 A1 Jun. 27, 2019

(30) Foreign Application Priority Data

Dec. 23, 2017 (IN) .............................. 201741046471

(51) Int. Cl.
*H04L 29/06* (2006.01)
*H04L 9/08* (2006.01)

(52) U.S. Cl.
CPC ........ *H04L 63/0209* (2013.01); *H04L 9/0891* (2013.01); *H04L 63/0245* (2013.01);
(Continued)

(58) Field of Classification Search
CPC ............... H04L 63/166; H04L 63/0272; H04L 63/0245; H04L 63/0248; H04L 63/061;
(Continued)

(56) References Cited

U.S. PATENT DOCUMENTS 8,782,393 B1 * 7/2014 Rothstein ............ H04L 63/0281
713/151
2003/0018891 A1 1/2003 Hall et al.
(Continued)

FOREIGN PATENT DOCUMENTS

EP 3089424 11/2016

OTHER PUBLICATIONS

Kavadias, C. D., et al. "A monitoring/auditing mechanism for SSL/TLS secured service sessions in Health Care Applications." Technology and Health Care 11.1 (2003): 1-9. (Year: 2003).*
(Continued)

*Primary Examiner* — Syed A Zaidi
(74) *Attorney, Agent, or Firm* — Hanley, Flight & Zimmerman, LLC

(57) ABSTRACT

A network security platform (NSP) device and interaction method are disclosed. The interaction method provides network packet analysis for secure transmission protocols using ephemeral keys or keys that are negotiated dynamically. The NSP may be part of an Intrusion Protection System, or firewall. The disclosed approach does not use man-in-the-middle proxy. Instead, it includes monitoring connections ends: client and/or server, to intercept the required data or negotiated (or changed) encryption keys. Decrypted data may be sent to an NSP sensor in a secure manner for analysis. Alternatively, intercepted keys used for the encrypt/decrypt operations may be sent to an NSP sensor in a secure manner every time they are changed. The NSP sensor may then use the obtained keys to decrypt traffic prior to providing it to the inspection engines. Embodiments focused on inbound traffic to a web server may coordinate between a web server and an NSP.

17 Claims, 8 Drawing Sheets

(52) U.S. Cl.
CPC ........ *H04L 63/0428* (2013.01); *H04L 63/061*
(2013.01); *H04L 63/145* (2013.01); *H04L 63/1408* (2013.01); *H04L 63/1416* (2013.01); *H04L 63/166* (2013.01); *H04L 63/18* (2013.01); *H04L 63/205* (2013.01); *H04L 63/0272* (2013.01)

(58) Field of Classification Search
CPC ............. H04L 63/1408; H04L 63/1416; H04L 63/145; H04L 63/0209; H04L 63/18; H04L 9/0891
USPC .......................................................... 713/151
See application file for complete search history.

(56) References Cited

U.S. PATENT DOCUMENTS

| | | | | |
|---|---|---|---|---|
| 2004/0015725 | A1* | 1/2004 | Boneh | H04L 63/166 713/160 |
| 2005/0031122 | A1* | 2/2005 | Vanstone | H04L 9/005 380/30 |
| 2005/0147037 | A1* | 7/2005 | Maimon | H04L 63/1425 370/230 |
| 2006/0161973 | A1* | 7/2006 | Royer | H04L 63/0428 726/8 |
| 2007/0074282 | A1* | 3/2007 | Black | H04L 63/166 726/14 |
| 2007/0180510 | A1* | 8/2007 | Long | H04L 63/0236 726/10 |
| 2007/0192845 | A1* | 8/2007 | Lankheim | H04L 67/16 726/12 |
| 2007/0253553 | A1* | 11/2007 | Abdul Rahman | G07F 7/1025 380/259 |
| 2008/0013731 | A1* | 1/2008 | Hauge | H04N 21/435 380/277 |
| 2008/0104390 | A1* | 5/2008 | VanHeyningen | H04L 9/12 713/151 |
| 2008/0104686 | A1* | 5/2008 | Erickson | H04L 29/06 726/7 |
| 2009/0013399 | A1* | 1/2009 | Cottrell | H04L 63/0421 726/12 |
| 2010/0281250 | A1* | 11/2010 | Moineau | H04L 63/0227 713/151 |
| 2010/0299525 | A1* | 11/2010 | Shah | H04L 63/0428 713/171 |
| 2014/0115702 | A1* | 4/2014 | Li | G06F 11/30 726/23 |
| 2014/0122578 | A1* | 5/2014 | Lee | H04L 67/42 709/203 |
| 2014/0143852 | A1* | 5/2014 | Cottrell | H04L 63/0281 726/12 |
| 2015/0106624 | A1* | 4/2015 | Gero | H04L 9/0643 713/171 |
| 2015/0229481 | A1* | 8/2015 | Prince | H04L 63/0823 713/175 |
| 2015/0288679 | A1* | 10/2015 | Ben-Nun | H04L 67/141 726/10 |
| 2016/0134659 | A1* | 5/2016 | Reddy | H04L 63/20 726/1 |
| 2017/0026414 | A1* | 1/2017 | Frydman | H04L 12/66 |
| 2017/0093796 | A1* | 3/2017 | Wang | H04L 63/0823 |
| 2017/0214660 | A1* | 7/2017 | Shah | H04L 63/0281 |
| 2017/0374062 | A1* | 12/2017 | Brady | H04L 63/0823 |
| 2018/0034783 | A1* | 2/2018 | Rothstein | H04L 63/0428 |
| 2018/0167207 | A1* | 6/2018 | Chaubey | H04L 63/168 |

OTHER PUBLICATIONS

Phillips, Mat. TLS Filter: An Application-Level Firewall for Transport Layer Security. Technical Report. URL: http://www.doc.ic.ac.uk/teaching/distinguished-projects/2014/m.phillips.pdf, 2014. (Year: 2014).*
Dierks, Tim, and Eric Rescorla. "RFC 5246—the transport layer security (TLS) protocol version 1.2." Internet Engineering Task Force (2008).. (Year: 2008).*
NPL Search Results (Year: 2020).*
NPL Search Terms (Year: 2020).*
Dierks et al., "The Transport Layer Security (TLS) Protocol," Version 1.2, Aug. 2008, https://tools.ietf.org/html/rfc5246, RTFM, Inc, 105 pages.
McAfee, LLC, "McAfee Network Security Platform 9.1," 2008, https://kc.mcafee.com/resources/sites/MCAFEE/content/live/PRODUCT_DOCUMENTATION/26000/PD26779/en_US/NSP_91_Best_Practices_Guide_revG_en-us.pdf, 80 pages.
Web Technology Surveys, "Usage of web servers for websites," retrieved on Sep. 28, 2018, https://w3techs.com/technologies/overview/web_server/all, 3 pages.
International Bureau of WIPO, "International Preliminary Report on Patentability," issued in connection with application PCT/US2018066879, dated Jun. 23, 2020, 10 pages.
International Searching Authority, "Written Opinion and International Search Report," issued in connection with application PCT/US2018066879, dated Feb. 22, 2019, 13 pages.
Freier et al, "The SSL Protocol Version 3.0," Netscape Communications, Transport Layer Security Working Group, https://tools.ietf.org/pdf/draft-ietf-tls-ssl-version3-00.pdf, Nov. 18, 1996, 64 pages.

* cited by examiner

DECRYPTING TRANSPORT LAYER SECURITY TRAFFIC WITHOUT MAN-IN-THE-MIDDLE PROXY

CROSS REFERENCE TO RELATED APPLICATIONS

This disclosure is related to U.S. patent application Ser. No. 15/946,626, having the same title, the same inventors, and filed on the same date as this application, which is incorporated by reference in its entirety for all applicable purposes.

TECHNICAL FIELD

Embodiments described herein generally relate to a method, system, and apparatus for improved inbound secure socket layer (IBSSL) to support stronger ciphers and security enhancements for providing malware and virus protection for web servers and other enterprise servers.

BACKGROUND

Today increasing numbers of web servers are migrating to a more secure version of secure hypertext transport protocol commonly known as HTTPS. HTTPS uses secure socket layer (SSL) and transport layer security (TLS) to provide different levels of encryption as necessary for different levels of security. As encryption techniques are improved with HTTPS, it becomes increasingly difficult for network sensing devices like an Intrusion Protection System (IPS) or virus/malware scanning firewall to perform packet inspection to analyze network traffic and identify potential attacks. Sensors have been developed to be able to decrypt data in network packets in two ways. The first, is referred to as a Man-in-the-Middle (MITM) proxy. The second is referred to as the "known key" approach.

In some implementations network security platforms (NSPs), sometimes referred to as sensors, prefer to use the "known key" approach because it is more efficient for heavy loads (e.g., large amounts of network traffic and/or large amounts of clients). This is particularly true for web servers having the intent of protecting the web servers inside an enterprise network from untrusted clients on a public network (e.g., the Internet). Analysis of this kind of network data may be referred to as an IBSSL decryption feature on a network sensor or firewall (e.g., an NSP or other computer device at the edge of the protected network). In prior art systems, the decryption feature is based on principle of providing the known private key of the "to be protected web server" on the NSP/sensor as part of its network configuration. This single private key may be used to decrypt the encrypted traffic to/from the web server. Standards provided for SSL/TLS protection provide support for a suite of public key cryptographic algorithms to implement the security. However, today IBSSL is only known to support the RSA algorithm (RSA is named after its inventors Rivest-Shamir-Adleman), which is a widely deployed algorithm. Even though RSA is widely used, there have been weaknesses found in that algorithm. As a result even stronger ciphers with more frequently changing keys are being introduced.

In the past, an administrator provided the known private key, as mentioned above, as part of the configuration of the protecting device (e.g., NSP). As a result, the NSP or other device could perform its function until the key was changed on the web server, for example. Newly introduced techniques for protecting network traffic include changing the web server key more frequently and thus make it impractical for an administrator to change the key on the NSP type devices. Without a key, the NSP cannot inspect the contents of network packets (e.g., deep packet analysis) and its capabilities as far as protecting against malicious data are degraded. Disclosed techniques address this and other problems, in part, by providing several enhancements to allow NSPs and other network protection devices to continue to perform desirable analysis even when the web server encryption key is changed frequently (e.g., ephemeral keys used by newer cipher suites).

DESCRIPTION OF EMBODIMENTS

Figure 1:
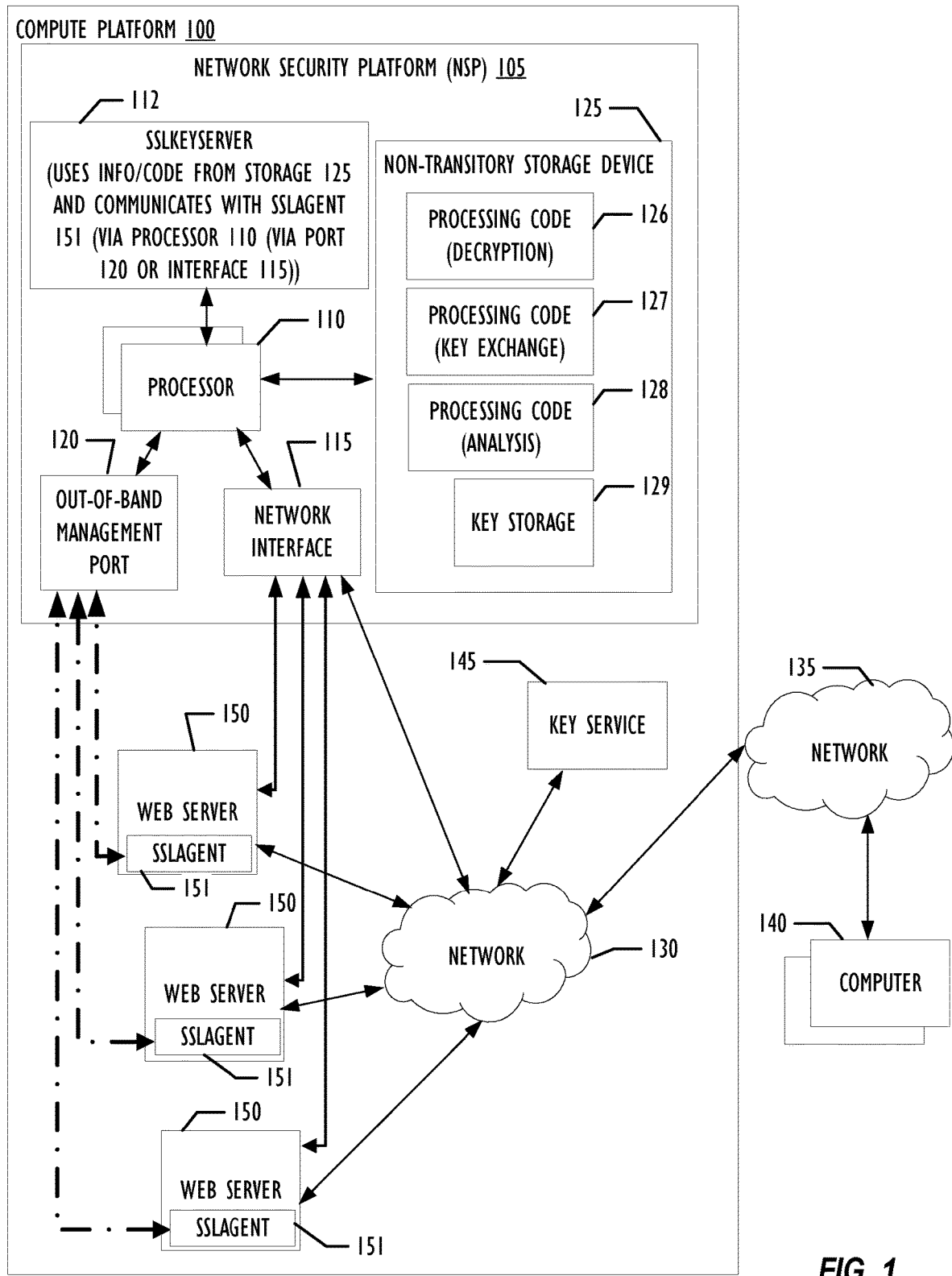
FIG. 1 is a block diagram representing a compute platform 100 and components of a network communicatively coupled to compute platform 100, according to some disclosed embodiments.

As briefly mentioned in the background section above, security for network transmissions continues to be an evolving art. As attacks become more sophisticated, users and enterprises are increasing their security measures. In particular, stronger (e.g., stronger cyphers) and less vulnerable (e.g., more secure keys) encryption techniques are being adopted. As far as web communication goes, use of TLS/SSL has increased over recent years and these standards have been enhanced to allow for stronger cyphers and ephemeral keys. Use of HTTP 2.0 is also on the rise. Current known implementations of HTTP 2.0 require the use of TLS for data confidentiality. There is a need for network security platforms (sometimes called network security appliances, or simply network appliances), such as intrusion protection systems IPS or web application firewalls WAFs to decrypt TLS communication packets so that their contents may be inspected for viruses and malware to protect web servers from attack. In general, network appliances may be implemented to perform decryption analysis in one or more of the following three methods (combinations of the three methods are also possible).

In the first method, the network appliance may be configured to act as a man-in-the-middle (MITM) TLS proxy for communication. Using a MITM approach, the network appliance may be situated, for example, physically and logically in the network communication path between a client and a protected web server. The client establishes one TLS session with the network appliance, perhaps unaware that the network appliance is not the actual web server, and the network appliance establishes another session with the server. In this MITM scenario, the network appliance may receive all messages from the client destined for the web server and perform analysis prior to forwarding the "determined good" packets of the messages to the web server. In this manner the network appliance acts as a firewall, bridge, and proxy between the client and the server. Because the two sessions (e.g., client to network appliance and network appliance to web server) are terminated and initiated by the network appliance, the appliance may be able to decrypt the payload. In particular, different encryption techniques and keys may be used for each session with the actual client never communicating directly to the web server. Accordingly, if a communication encryption key is changed it does not have to be communicated to all parties. The overhead of the MITM approach is at least two-fold because the MITM must, in this example, perform a complete decryption and re-encryption of data as part of its processing.

In the second method, there is a sharing of public/private key pair information between the web server and the network appliance based on a user (e.g., web server administrator) configuration. Because the encryption key information may be made available to the network appliance, the network appliance may be able to decrypt all TLS communication for analysis prior to forwarding the original message to the server. This may be referred to as a "shared key method" because the network appliance is using the same key that the server is using to decrypt and encrypt (e.g., at the client) all TLS communication with this server. This approach may have significantly less overhead than the MITM approach (first method discussed above) because the network appliance needs to only decrypt communication and there is no need to perform TCP segmentation operations or to re-encrypt the transmission prior to forwarding "determined good" packets of the message to the web server. That is, the network appliance intercepts the communication from the network prior to it arriving at the web server, performs a "look-in" analysis without altering the communication parameters of the packets, and allows any satisfactory packets to continue onto the web server. For a traditional shared key method to work, TLS may use an RSA based cipher suite because the key is static for a web server and may be provided by a system administrator to a network appliance as part of its initial configuration. The network appliance may utilize that static key to perform its analysis. However, static key cipher techniques may be prone to key cracking because the keys are the same for all sessions and may be persistent. Sometimes ciphers may be configured to use Diffie-Hellman exchange between clients and server to come up with a key that changes for every session. Thus, the system administrator approach will not work for this cipher technique. Additionally, TLS version 1.3 is set to remove support for cipher suites that use RSA to derive the keys. As a result, new techniques for key management to implement a key sharing method may be required and are discussed further below.

In a third method, the TLS communication from the client could be terminated at a server load balancer. The server load balancer may then send client communication to the server without encryption. A network appliance in the network communication path between the server load balancer and the web server may be configured to inspect and analyze data in its unencrypted state. This third approach introduces different types of security concerns than the first or second methods, because the "last leg" of the inbound messages are not decrypted and may be available in plain text. The plain text data on the "internal" network (e.g., between server load balancer and web server) may allow other devices (or personnel) potential access to sensitive data.

Techniques of this disclosure generally apply to implementations that maintain end to end security. End to end privacy of communication may be a more significant concern on public cloud environments as opposed to communications strictly within a private data center. High-level overviews of two aspects of disclosed embodiments are presented next, followed by more detailed embodiments of disclosed techniques, methods, and systems, with reference to the Figures as necessary.

High-Level Overview of Key Exchange Embodiments

At a high level, embodiments disclosed address a client to network appliance to web server TLS communication session. FIG. 1, discussed below, illustrates Network Security Platform (NSP) 105 that represents an example of a network appliance as used in this overview discussion. Each network communication session (usually referred to as simply "session") begins with a client initiating the session by sending a ClientHello handshake message. The server, being configured with a strong cipher (e.g., Diffie-Hellman) generates a public key value to be used for key generation for the rest of the session. The ClientHello message also contains a cryptographically strong random number. Next, the network appliance may create a mapping between the network flow of the client and server communication and their random numbers.

Next, the client may generate its public value, derive the session key, and respond with its public value. The client may also indicate it is ready to negotiate details of encryption using a ChangeCipherSpec handshake. The web server may then use its own public value along with client's public value to generate the session key. Interceptor logic, which may, for example, be implemented in a program or library function on the web server, obtains this session key and provides the session key over a secure link to the network appliance along with client and server random numbers. The network appliance may then "look up" the associated network flow mapped to this set of client and server random numbers that were created and obtained above.

The network appliance may store the key information in internal data structures that may maintain an association for a particular client to server network flow (e.g., session). The web server may then respond with its readiness to encrypt using ChangeCipherSpec. At this point network communication may include application data that flows from either the client to the server or the server to the client.

As the application data passes through the network appliance, the network appliance is now able to use keys stored and associated with a particular network flow to decrypt any TLS encrypted records and inspect unencrypted application data securely and locally on the network appliance. Because the keys are automatically obtained by the above-mentioned interceptor logic, they may be obtained every time they change and provided automatically, via the secondary secure communication path, to the network appliance.

For security reasons, it may be necessary and desirable to provide the interceptor logic in a manner such that is configured by a system administrator of the web server as part of the web server configuration. The interceptor logic may then function without further day to day involvement of a system administrator.

High-Level Overview of Key Interception Embodiments

In most implementations, web servers use a shared library (e.g., a DSO on Linux and a DLL on Windows) to implement the TLS protocol. One method to intercept keys or decrypted data includes intercepting or hooking the function calls to this library to obtain the encryption keys as they are computed for each session. Once intercepted, the key information may be sent through the disclosed secure secondary communication path to one or more network appliances that are configured to protect a corresponding web server.

Using the key information, appropriate network appliances may then be able to decrypt data messages of the session and perform appropriate analysis and inspection (e.g., deep packet analysis). In embodiments where keys are not intercepted, decrypted data may be intercepted and send via the secure secondary communication path to one or more network appliances for inspection.

Interception of keys represents a more efficient implementation and is the subject of this example embodiment. It should be noted that keys are negotiated and sent between the client and the web server prior to application data flow in a session. If data from a session flow is made available to a network appliance after the initial key exchange, the web server and network appliance may temporarily utilize a potentially less efficient or optimal implementation (e.g., transmitting decrypted data) until key data may again be intercepted.

When keys are intercepted, they may be associated with a particular session using information stored at the network appliance so that the network appliance may properly maintain key data for each session. Also note that because the keys are intercepted at the web server, the network appliance, in this example embodiment, is not required to perform intensive cryptographic operations needed to generate keys and further improves its efficiency. Additionally, a properly implemented key interception embodiment does not need to perform TCP segmentation that is required for being a proxy in the network, thereby saving additional CPU cycles that would otherwise be required for TCP segmentation.

In the OpenSSL shared library implementation of web servers, callbacks are provided to the server after every handshake message is received. The general flow of a TLS session is defined in the Internet Standard known as RFC 5246 and is discussed further below with reference to FIG. 6. In this handshake framework, the client and server will compute the encryption key after receiving the ServerHello and ClientKeyExchange messages respectively. On the server, before the ChangeCipherSpec message is sent, a callback may be registered by an interceptor library that obtains the: encryption key, client random, and server random numbers, that will be used for the session. Once obtained, an agent on the web server, for example, may communicate with an agent on the network appliance, via a secure secondary communication path, to send any required obtained data to the network appliance.

After the handshake initiation of a session is completed, normal application data flow proceeds on the session and encrypted application data may be exchanged between client and server. Because the network appliance has been made aware of the key material prior to application data flow, the network appliance may be able to decrypt all messages in this client/server session. Further, in some embodiments, the network appliance may use the random numbers (i.e., client and server random numbers) to identify the network flow (or session) that is associated with the appropriate key material.

A variation of this embodiment may be to place a hook into library calls that a web server makes to read decrypted data. For example, with OpenSSL, the interceptor library can hook SSL_read( ) and SSL_write( ) calls and send the payload in some manner either via the network or the secure secondary communication path (e.g., clear text) to an external appliance for processing. In this variation, efficiency may not be optimal, but sending keys to the network appliance is eliminated because the network appliance receives clear text application data. As mentioned briefly above, this may introduce different security concerns because of the clear text transmission of data expected to have end to end encryption and may be used in a temporary manner until keys may be exchanged.

For the above various implementations, loading of an interceptor library into the web server program environment may be performed in a manner transparent to clients and web servers. In most cases these implementations should be performed by a system administrator configuration change but may remain transparent to the other computer systems (see FIG. 4). For example, in some Unix or Posix compliant operating systems, shared libraries may be pre-loaded for a program by setting the LD_PRELOAD environment variable. During the load necessary function calls can be hooked such that a shared library "wrapper" is created by the disclosed interceptor library.

Given the above understanding of the key exchange aspect and the key interception aspect, more detailed embodiments of disclosed techniques, methods, and systems, are now discussed with reference to the Figures as necessary. Although interception techniques are described from the perspective of a web server, another implementation where interception takes place on the client side of the SSL connection is also possible. In some implementations, a client side interceptor library and secure secondary communication path, this time between the client and NSP 105 for example, may be configured to work in a similar manner to that described herein for the web server.

As explained above, in a TLS communication, the end nodes client and server advertise their cryptographic algorithm capabilities and come to an agreement based on a common factor that both support through a procedure called handshake. In the handshake, client and server start using an asymmetric cryptographic algorithm to exchange the symmetric key which will be used for encrypting the application data. The TLS specification recommends three algorithms: RSA, DH, and ECDH. The first algorithm is a key exchange algorithm where the client generates the symmetric key and sends it over the network encrypted, while the latter two are key agreement algorithms, where both the end parties generate a common symmetric key through mathematical functions. Essentially no key is exchanged over the network.

Because of ever increasing security requirements and data privacy restrictions, customers (and web servers) are moving away from the RSA public key exchange suite to stronger ciphers that support Perfect Forward Secrecy (PFS). In short, PFS means if a rogue entity obtains the private key at a later point in time, the rogue entity should not be able to decrypt the previous encrypted communications. Diffie-Hellman and its variants are encryption algorithms that provide PFS. But the known key approach used in prior art implementations of IB SSL fail with PFS cipher suites as the pair of keys public key and private key are dynamically generated. As a result, prior art web servers that are configured to use PFS suites result in a sensor (e.g., network appliance) that just passes through the encrypted traffic of any session with ephemeral keys. Obviously, just passing data through without inspection is not desirable as it could lead to a security hole in any web server protection scheme.

FIG. 1 illustrates a block diagram representing a compute platform 100 and components of a network communicatively coupled to compute platform 100, according to some disclosed embodiments. In compute platform 100, NSP 105 may be configured to execute a secure server referred to as the "SSLKeyServer" 112. In this example, each SSLKeyServer 112 is shown to have a secure secondary connection with SSLAGENT 151. For example, an "out-of-band" connection, via out-of-band management port 120, on NSP 105. The out-of-band connection through management port 120 may be one implementation for the secure secondary connection described herein. The secure secondary connection may be used for securely sharing unencrypted data or keys between a web server 150 and network security platform NSP 105. In one embodiment, the secure secondary connection may transmit data over an encrypted channel using PFS ciphers. The secure secondary connection may alternatively be implemented using a network based connection or a non-network connection such as a data cable connection between an IO port on each web server 150 and an IO port on NSP 105 (e.g., out-of-band management port 120). Further, a virtual private network (VPN) may be established as a data transport for the secure secondary connection between SSLKeyServer 112 and SSLAGENT 151.

Other implementations of a secure secondary connection are also possible (or multiple concurrently available connections of different types may be used if desired) with the intent that only web server 150 and an appropriate NSP 105 are able to obtain key data or unencrypted session information. Of course, in a potentially less secure embodiment, it may not be required to utilize a secure secondary connection to practice the disclosed embodiments. Data that may otherwise be sent over the secure secondary connection may also be sent over a traditional network communication path between the web server 150 and NSP 105, for example via network interface 115. Regardless of the implementation of the secure secondary connection, session data flow may be exchanged between any web server 150 and NSP 105 using network interface 115 or management port 120. For example, each web server 150 may connect to network 130 to communicate to NSP 105 on the secure secondary connection in addition to having a standard network communication connection with network 130. Although a single network 130 is illustrated in FIG. 1 for clarity of the drawing, any number of interconnected networks may be used.

FIG. 1 also illustrates public network 135 and client computers 140 that may connect to compute platform 100 via public network 135. Internal to compute platform 100, network 130 may represent a private network, for example, a network internal to an enterprise hosting web servers 150. Key service 145 is also shown connected to network 130 and may be used to store encryption keys in some embodiments, for example, for keys not stored in key storage 129, or for keys that may be made available from key service 145 to other compute entities attached to network 130. NSP 105 is an example of a network appliance and may include one or more processors 110. Processors 110 may be communicatively coupled to non-transitory storage device 125 which may store processing code (e.g., modules or programs) to configure processors 110 to perform one or more acts described to be performed by a network appliance in accordance with this disclosure. For example, processing code 126 may be used for decryption of session data or receipt of previously decrypted (e.g., plain text) data such that it may be analyzed by processing code 128. Processing code 127 represents key exchange code that may include code to participate in the interception of keys as described throughout this disclosure. Finally, non-transitory storage device 125 includes key storage 129 that may be used to store cipher information and information to maintain proper association with multiple sessions that may be concurrently active in compute platform 100 and processed by NSP 105. Additional code modules are possible and this list of components of non-transitory storage device 125 is not necessarily exhaustive. Further, a collection of code modules may participate together to act as SSLKeyServer 112, executing on NSP 105, to interact with an SSLAGENT 151 resident on any of web servers 150.

In the following few paragraphs, an example of implementation requirements and options for: an SSLKeyServer 112 (executing on NSP 105 in communication with SSLAGENT 151); SSLAGENT 151 (executing on a web server 150 as a communication counterpart of SSLKeyServer 112); and a sensor device (e.g., NSP 105 implemented on a firewall or router, for example) are discussed. Following this discussion of these components that may be configured to work together to support a system wide implementation of this disclosure, a discussion of an overall system and other details of one or more possible implementations is provided with reference to FIGS. 2-6. Following the system level discussion, aspects of processors and components that may be used is provided with reference to FIGS. 7-8.

In one example implementation, SSLKeyServer 112 may be configured to perform a variety of functions to support the one or more disclosed embodiments (or even additional functions not directly related to this disclosure). That is, SSLKeyServer 112 (and SSLAGENT 151) may be configured to be adaptable by way of plug-ins or other types of post-development (post deployment) configuration methods so that a network administrator may use the disclosed infrastructure to support additional capabilities.

To implement SSLKeyServer 112, various types of software application configuration options may be used based, in part, on the architectural implications of operating system and hardware capabilities. For example, implementation techniques may include: a plug-in to a web server application; a stand-alone executable; a persistent process, an extension to an operating system (e.g., shared library), etc.). In one example, a new Linux process may be introduced inside the session border controller (SBC) process group. This new process may be configured to run SSLKeyServer 112 that may be configured to accept SSL connections from any SSLAGENT 151 installed on the client sensor devices (e.g., on NSP 105).

To be clear, there are two clients discussed in this disclosure. A web browser executing on client device (e.g., computer 140) may be referred to as a client application/device. Also, a sensor (e.g., NSP 105) represents a client device to a server (e.g., web server 150) and an SSLAGENT 151 represents a client with respect to SSLKeyServer 112. The context of the use of the word "client" will make clear to those of ordinary skill in the art, which client is being referred to. In general, references to "client" without qualification will refer to the web browser client.

The example new process may also create a shared memory area to store key information. In one example, keys are stored in a hash table mapped over the shared memory. In this example, the Client Random (CR) and the Server Random (SR) fields may be used as the Key to the hash function (e.g., similar to a key element in a record of a database table providing unique lookup). The Master Secret (MS) may then be stored as the value. The shared memory area that may be obtained (e.g., allocated) by the process should be large enough to hold keys and other required data for the maximum number of SSL connections supported on the platform.

In one implementation, SSLKeyServer 112 may create a shared memory to host the Randoms (e.g., both CR and SR) and Master Secret. Each record may be a variable length message that occupies 128 bytes of data. See element 550 of FIG. 5, containing client random 555, server random 556, and master secret 557. In some cases, the record may be padded to have a consistent record length. Optionally, the variable length messages may occupy different amounts of data but this implementation may be more complicated and not provide sufficient benefit to offset a cost of the complication (e.g., processing overhead vs memory). As mentioned above, a system configured to support storing of 0.1M records in the shared memory, may result in usage of 16 MB for the shared memory for key information storage.

Figure 3:
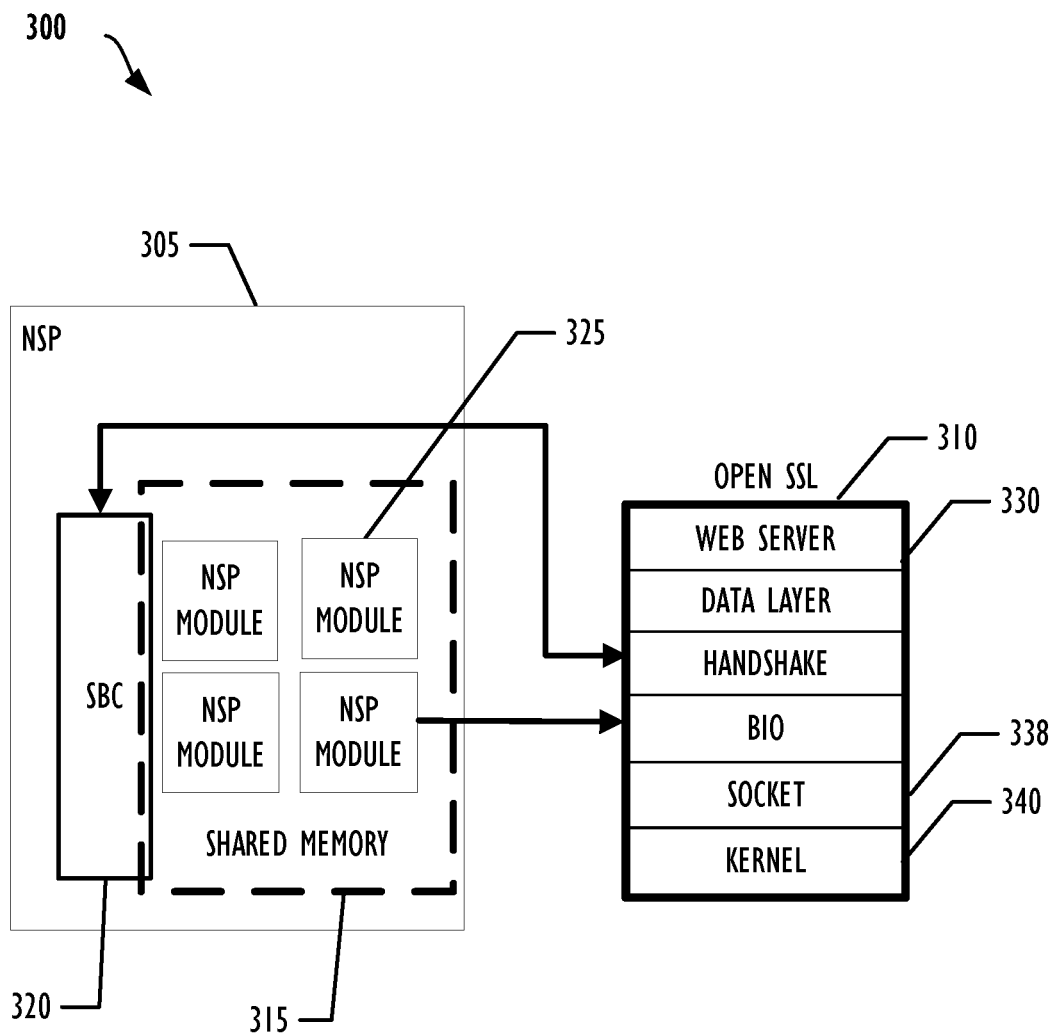
FIG. 3 is a block diagram representing a subset of components of a network security platform (NSP) 305 and a logical layered representation of OpenSSL 310 according to some disclosed embodiments.

In one embodiment, SSLKeyServer 112 may read a configuration obtained from a network security monitor (NSM) of IP addresses, for example both IPv4 and IPV6, for devices that can connect to the sensor and update the firewall configurations of the sensor. Without this information, SSLAGENT 151 may not be able to connect to the sensor (e.g., NSP 105) because of security restrictions or other reasons. In use, SSLKeyServer 112 may provide a self-signed certificate. For example, an RSA certificate, appropriate for connecting with NSP 105, may be packaged with an SSLAGENT library to be installed on each appropriate web server 150. This certificate and the private key may be pre-configured along with the sensor software such that a system administrator installing a particular sensor would obtain the appropriately matched SSLAGENT library. The private key may be encrypted using AES256-GCM (or some other encryption technique) before packaging in the sensor image (e.g., stored in non-transitory storage device 125 by a sensor vendor). SSLKeyServer 112 may then, during its initialization procedure, decrypt the private key on the filesystem and provide it to the OpenSSL library on the web server. An SSLAGENT 151 and SSLKeyServer 112 may also use a secured network connection and be enabled to support DH(E) or ECDH(E) key exchange algorithms and AES256(CBC/GCM) for symmetric ciphers. In some implementations, SSLKeyServer 112 executes a cleanup task to purge any records which have been marked for deletion by any NSP modules (see element 325 of FIG. 3 representing hardware or software NSP modules to interact with shared memory 315). For example, after a successful lookup or for cleanup because the record may have been aged for a configurable amount of time (e.g., 10 or more seconds). In one example, SSLKeyServer 112 may use a Linux epoll mechanism to multiplex the SSL/TCP connections from the SSLAGENTS 151. This may be implemented using a variable number of pthreads to provide for proper scaling based on capacity.

SSLAGENT 151 (on web server 150)

As explained above, SSLAGENT 151, may be configured as software installed on each web server 150 to interface with (or wrap) an OpenSSL library. In some implementations, SSLAGENT 151 makes use of a callback mechanism provided in OpenSSL to obtain access into each SSL handshake process. In some cases, for example, when the callback mechanism is not possible, SSLAGENT 151 may override one or more functions of the SSL APIs called by the web server. Thus, SSLAGENT 151 may use a combination of callbacks and API wrappers to get the required information (e.g., for decryption and/or key exchange). In some embodiments, SSLAGENT 151 may establish a secure secondary connection to each sensor (e.g., NSP 105) and provide the session keys over this secure communication path. SSLAGENT 151 may be configured to support most of the commonly used operating system distributions. SSLAGENT 151 may also be packaged (e.g., at the sensor vendor) with the public key of an associated sensor and may use that pre-packaged key to make an initial SSL connection to the appropriate sensor. In this manner, a system administrator (and corporation) may be provided with an initially secure network such that no security vulnerabilities are present when new devices are initially plugged into a network. Authentication may be critical because each SSLAGENT 151 may have access to and share future session keys with appropriate sensors (e.g., NSP 105). Any rogue entity obtaining information (for example prior to security being configured) could potentially break the secure communication infrastructure. It is in part for this reason that the disclosed example represents devices and libraries that are pre-configured for security at the vendor rather than as part of install. Clearly, after a secure install is completed using factory security defaults (that may be unique per purchaser), a system administrator may be able to alter these keys to change them from their factory security defaults.

Each SSL connection may be established on an existing TCP connection. Accordingly, one of the ways to uniquely identify an SSL connection would be to use the 5-tuple of the TCP connection. However, there appears to be no direct method to get this 5-tuple information from the OpenSSL library. To address this, one implementation uses known fields from the SSL handshake procedure, which are presumed to be unique across all SSL connections active on a particular device. One example of two potential parameters for this use are the Client Random (CR) number sent in the Client Hello and the Server Random (SR) number sent in the ServerHello that are sent in the series of messages for the SSL handshake protocol. In some implementations, these two fields are used to identify an SSL connection and to map to the corresponding session key. Both the CR and SR fields are typically 32 bytes in size. The session key is usually 48 bytes. Accordingly, when adding all of these together, SSLAGENT 151 sends 128 bytes (pads added as necessary) to the sensor (e.g., NSP 105) for every new SSL connection that the sensor is expected to support. Note also, that the keys are sometimes exchanged at the beginning of the connection only. The session key referenced here refers to the Master Secret (MS) as described using SSL terminology. In an actual SSL implementation, first a Pre-Master Secret (PMS) is generated, then, from the PMS, a MS is generated. From the MS, different key blocks may then be generated for encryption, hashing etc. In some disclosed embodiments, it is SSLAGENT 151 that obtains the MS (using any of the disclosed techniques) and shares this information with the sensor (e.g., SSLKEYSERVER 112 on NSP 105).

In some implementations, SSLAGENT 151 may be in the form of a shared library (or shared object (.so file)) that is loaded before any of the web server server-side support code gets loaded. This may be achieved in a variety of ways, for example, by using the Linux loader environment variable LD_PRELOAD. LD_PRELOAD variable may be set at the command line as in the example below:
LD_PRELOAD=/home/aabraham/ssl_shim/lib/libmcafee_sslshim.so $HTTPD ${APACHE_ARGUMENTS} −k $ARGV This implementation may be used to ensure that the appropriate shared library (e.g., a shared library configured with SSLAGENT 151 support) is loaded first. Any functions that are to be overridden that are also present in any subsequently loaded shared libraries can be implemented in the overriding SSLAGENT library and alter the original implementation. That is, because they are loaded first, they will effectively replace and deprecate the subsequently loaded libraries having the same entry points (e.g., function names or addresses of shared code). The SSL library calls which may be trapped and replaced in this manner include, but are not limited to:

SSL_library_init( ) called to initialize the library

SSL_CTX_new( ): called when a new SSL context is created. Typically, there exits one SSL context per one process.

SSL_new( ): called when a new SSL connection is created. SSL connection refers to each connection that gets established via an SSL handshake. There could be multiple SSL connections on the same underlying TCP connection.

SSL_read( ): Web server calls this OpenSSL API to read packets. It is a blocking call and does not return until the handshake is completed. After the completion of handshake, it returns the decrypted data.

SSL_write( ): Web server calls this API to pass on plain-text data to the OpenSSL library which then encrypts the data and then sends it over the TCP connection.

SSL_set_msg_callback( ): OpenSSL API to define a function callback for observing the SSL/TLS protocol messages.

In the function SSL_CTX_new, the SSLAGENT 151 replacement library may establish a connection with SSLKeyServer 112 running on the sensor (e.g., NSP 105) using a pre-determined port (for example port 8501). The sensor IP address may be configured in a configuration file for installation by a system administrator, for example, along with SSLAGENT 151 on the web server. Some web server implementations run independent processes and multiple threads within each process to scale connection handling from multiple clients (e.g. Apache web server). Alternatively, some web servers only run multiple threads to scale (e.g., Nginx web server). The SSLAGENT 151 replacement library should be configured to handle either model. In one implementation, SSLAGENT 151 scales by using a new connection for every thread of the web server. In web server threading models, where only processes are used, there may be one connection to the sensor per process. And in web server threading models, where multiple threads are used within a single process, there may be as many connections to the sensor per process. This is done, in part, to avoid sharing of connections between the web server threads/processes, thus addressing synchronization concerns. In general, web servers are architected for scale and disclosed implementations should not introduce a bottleneck with an SSLAGENT library override. As there may be a significant number of processes and threads on a high-end web server, there may be a correspondingly large number of connections being setup at the sensor (e.g., NSP 105). As a result, the connection setup for any particular NSP 105 may be optimized as appropriate to reduce the total number of connections where possible.

SSLAGENT 151 may use an SSL connection to secure the communication between the client (e.g., web browser) and the server because critical data (e.g., credit cards or personal information) may be exchanged. Any inappropriate person obtaining or having visibility into this data might be able to decrypt the flows and tap into the data. SSL is intended to ensure confidentiality through a secure session connection. In some implementations, SSLAGENT 151 may use the server's Certificate (e.g., sometimes provided by a certification authority and assigned to authenticate a specific web server) to authenticate the server. Also, as described above SSLAGENT agent library may have the SSLKEYSERVER 112 server's public key for a particular NSP 105 packaged as part of its factory configuration. In this case, the NSP 105 is only required to authenticate the server, so that the client (e.g., web browser session connecting to or through NSP 105) is sure that it is connecting to a genuine server prior to sharing any confidential data or key information. In this example, there is no need for client authentication as there is no benefit for a rogue entity in sharing any client side keys with the sensor (NSP 105).

After a connection to the server is setup, a function callback may be set using the API SSL_set_msg_callback( ). This callback gets called for every protocol message that is sent/received. For example, ClientHello, ServerHello etc. Also, different implementations are interested specifically in the ChangeCipherSpec message being sent out by the server to a particular client computer. This message from the server may be sent in direct response to a ChangeCipherSpec message from a specific client. This particular handshake message may be trapped so that an override library (e.g., SSLAGENT override library) may interrogate the OpenSSL library to get 3 variables mentioned above: ClientRandom (CR), ServerRandom (SR), and MasterSecret (MS). In one implementation, the callback is called after the message processing. Therefore, in this case the when the callback is called, the ChangeCipherSpec is already processed/generated by the server-side and new information about the session is ready to be obtained so that it may be provided, for example, via a secure secondary connection, to a sensor such as NSP 105.

Newer OpenSSL library versions (after version 1.1.0) provide APIs for getting these variables. To address earlier lower versions, the SSL object may be dereferenced to get the above information as show in the below pseudo code example:

```
void msg_callback(SSL *ssl, ... )
{
  const SSL_SESSION* session;
  crandom = ssl->s3->client_random;
  srandom = ss1->s3->server_random;
  session = SSL_get_session(ssl);
  mkey = session->master_key;
}
```

OpenSSL library v1.1.0 and above currently provide the following APIs to get the same information:

size_t SSL_get_client_random(const SSL *ssl, . . . )
size_t SSL_get_server_random(const SSL *ssl, . . . )
size_t SSL_SESSION_get_master_key(const SSL_SESSION *session);

After the above CR, SR, and MS information is obtained, the CR, SR, and MS information may be sent to a sensor such as NSP 105 supporting this specific session. It may be sent from the web server to the sensor, for example, using a secure secondary connect. In one example, the information may be sent using tag-length-value (TLV) format or other format that is understandable by a sensor. For example, see element 550 of FIG. 5.

NSP Sensor

As mentioned above, connections between an SSLAGENT 151 and an NSP sensor such as NSP 105 may need to be established using an NSM. Some currently available NSM implementations have UI frames "Domain>IPS Device Settings>SSL Decryption" used for configuring the IBSSL settings. RSA public key certificates may be loaded using the sub-frame option "Internal Web Server Certificates". Implementation of this disclosure may be designed to continue to support an RSA based known key approach. The current SSL decryption main wireframe could be updated to provide an option to enable/disable DH based decryption. A new sub-frame(tab) may be added for adding the IP addresses of web servers installing SSLAGENT 151 and authorized to communicate with a sensor such as NSP 105 (e.g., a white list approach). This white list may be later used for determining whether an SSLAGENT 151 is authorized to connect to a particular NSP 105. Additionally, a white list may be used to limit the number of SSLAGENTS 151 connecting to a particular NSP 105 (e.g., load reduction, security, performance). In one implementation, an NSM would give the list of IP addresses to the sensor as Atomic SNMP updates. A new segment for the IBSSL configuration may be defined. This list of IP addresses may also be used to open the firewall ports on the sensor. This also helps as a sensor does not necessarily authenticate the client connecting to it over the SSL channel. As mentioned above, Client-side authentication is not used on the SSL channel in some implementations.

Figure 2:
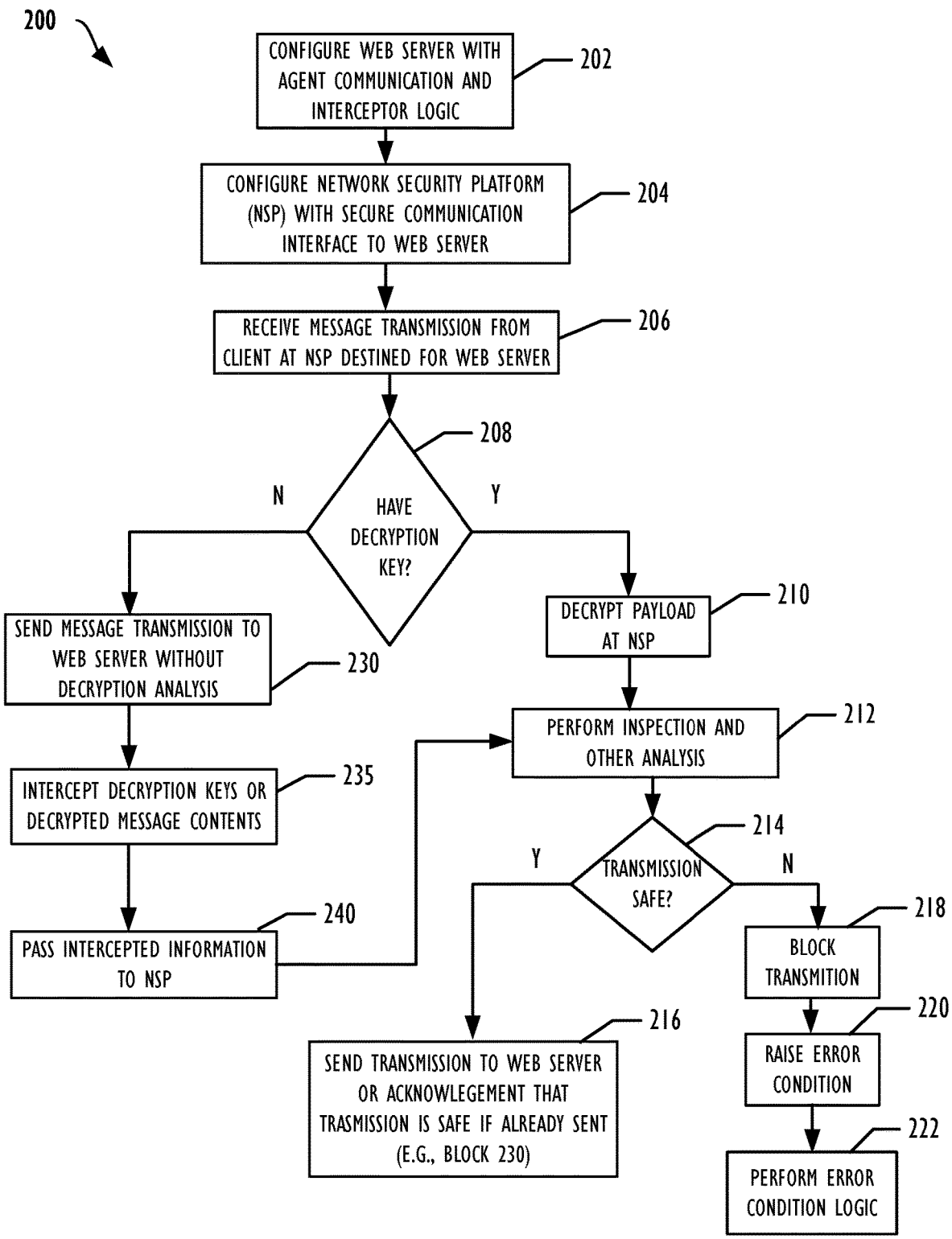
FIG. 2 is an example of process 200, illustrated in flow chart form, representing one example of configuring a network and processing encrypted network messages, according to some disclosed embodiments.

FIG. 2 is an example of process 200, illustrated in flow chart form, representing one example of configuring a network and processing encrypted network messages, according to some disclosed embodiments. Beginning at block 202 a web server may be configured with agent communication logic and appropriate interceptor logic (see FIG. 4). For example, agent communication logic may be an application configured to communicate between web server (e.g., web server 150) and NSP 105 on a secure secondary communication path. As mentioned above, this secure secondary communication path may or may not be network based communication. Also, interceptor logic may be implemented as a shared library specially configured to "wrap" an existing shared library, for example an OpenSSL shared library. Block 204 indicates that a network security platform (e.g., NSP 105) may be configured with a secure communication interface to a protected web server (e.g., web server 150). This secure communication interface represents the NSP side of the secure secondary communication path according to some embodiments. Block 206 indicates that a message transmission is received from a client at the NSP and destined for a web server. For example, a handshake message or a message that is part of an already established session. Decision 208 makes a determination if the NSP is already aware of a decryption key for an encrypted data message for a data communication session associated with the message currently being processed. If the decryption key for the session is known at the NSP, the YES prong of decision 208, flow continues to block 210 where the payload of the message may be decrypted for inspection and other appropriate analysis (block 212). Flow then continues to decision 214, where a determination can be made, based on the overall analysis, if the transmission is safe. Alternatively, if the key is not known, the NO prong of decision 208, flow continues to block 230 where the message may be sent to the web server without analysis that requires decryption. This may be a handshake message for example. Block 235 indicates that logic executed at the web server may intercept decryption keys for this session or may intercept data for analysis (at the NSP) after it has been decrypted. The type of intercepted information may depend on both the state of the session and/or the configuration implementation of the web server. Block 240 indicates that appropriate intercepted information may be passed, for example via the secure secondary connection, from the web server to the NSP. Flow then may continue to block 212 where the NSP may perform inspection and other analysis, as necessary, on the intercepted information.

Next, process 200 arrives at decision 214 to make a determination if the transmission is safe to provide to the web server (i.e., it has satisfactorily passed the analysis testing of block 212). If so, the YES prong of decision 214, process 200 continues to block 216 where the transmission may be sent to the web server, or in the case where the web server has already received and decrypted the information (i.e., from block 230), an acknowledgement that the message is safe to proceed may be sent. In short, the web server is provided information necessary to continue with processing this message. However, if the transmission is determined to not be safe, the NO prong of decision 214, flow continues to block 218 where the transmission may be blocked (or web server told to discard message) and an error condition may be raised (block 220). This path represents a case where the analysis and inspection performed at the NSP has determined that a threat may exist within the message transmission and additional error condition logic may be performed at either the web server, the NSP or both (block 222). Thus, process 200 may be repeated as necessary (from block 206) for messages arriving at an NSP from a client and represents one example of an IBSSL implementation.

Referring now to FIG. 3, block diagram 300 represents a subset of components of a network security platform (NSP) 305 and a logical layered representation of OpenSSL 310 according to some disclosed embodiments. Diagram 300 illustrates a logical representation that includes various software modules that may be involved in one or more implementations. In this example implementation, the left-hand side, NSP 305, represents the sensor side components. SBC 320 is the management plane application, while the NSP Moudules 325 implement the sensor data-plane. The SBC 320 and NSP Modules 325 processing may be modelled as Linux processes and they could be either running on the same physical CPU or different physical CPUs, depending on hardware configuration. NSP Modules 325 may be implemented in software or by using specially configured microprocessors as hardware elements of an NSP. SBC 320, is itself, a collection of different processes. OpenSSL 310 shown on the right-hand side of FIG. 3 depicts a software stack on the server-side (e.g., web server). OpenSSL acts as the glue layer between the web server application code and the Kernel 340 TCP/IPs stack exposed through the socket 338 interface. OpenSSL 310 on the north bound side presents decrypted data to the web server 330 and on the south bound side passes on encrypted data to the Kernel 340 IP stack. SSLAGENT 151 clients on a web server may connect to an SSLKeyServer 112 on a particular network appliance and share the session keys (e.g., share obtained changed key information). In one example implementation, the server-side functions associated with SSLKeyServer 112 may run as a standalone Linux process, for example, part of the SBC process group. The sensor may listen on connections coming over the out-of-band management port or other secure secondary connection (e.g., VPN). Because, in some implementations, only the keys are being shared, the management link bandwidth for most of the platforms should be adequate. In examples where decrypted data rather than keys is shared, throughput of the secure secondary connection should be implemented using a link that is sufficient for the expected traffic volume (e.g., have sufficient bandwidth).

Server processes associated with SSLKeyServer 112 may write required key information to a shared memory that may be accessible by the data-plane NSP Modules 325. Each of NSP Modules 325 may handle one or more SSL connection and use appropriate keys to decrypt necessary flows. This may be differentiated from other implementations of the IBSSL model where keys may be derived out of the flows, in part, because keys may already be available at the server and shared with any client (e.g., network appliance such as NSP 105) via the secondary secure connection. See FIG. 1.

In one example implementation, SSLAGENT 151 would generate a record of up to 128 bytes of data per connection. An example high performance NSP supports up to 3000 SSL connections per second. Accordingly, an implementation on this example NSP with all possible connections active would experience roughly 128×3000=3 Mbps (128 bytes×8 bits× 3000) of data spread over the multiple connections. Because most high performance NSPs also include a management interface that is capable of significant throughput (e.g., a 10G link) the interface should be adequate. Additionally, the disclosed example implementation should not overly stress a Linux TCP stack to handle this 3 Mbps data rate. Even if the number of SSL connections established per second were larger than this example implementation, there should be enough additional capacity on a management link because 3 Mbps plus other expected traffic does not reach the 10G link capability. To further address performance, an SSLKeyServer 112 may be implemented using a multi-threaded approach to handle any number of connections and data and be able to scale as needed (e.g., by initiating additional threads).

Shared memory 315 may also be used to host a Master Secret Table. In one implementation, each entry in the table requires 128 bytes (32×2 bytes of Random, 48 bytes of Master Secret, and pads). See element 550 of FIG. 5, containing client random 555, server random 556, and master secret 557. This amount of overhead indicates that a total of 0.1M of memory per SSL connection supported, for a total maximum (again based on the current example's parameters) of around 16 MB of shared memory 315 may be used. Additionally, memory may also be used to host the SSLAGENT 151 connection tables for both IPv4 and IPv6 clients. Accordingly, memory of an NSP should be configured to have enough capacity to handle the additional (minimal) overhead and most currently available NSPs are adequate.

Intercepting of Keys and Decrypted Data (Non-Exhaustive Examples)

Figure 4:
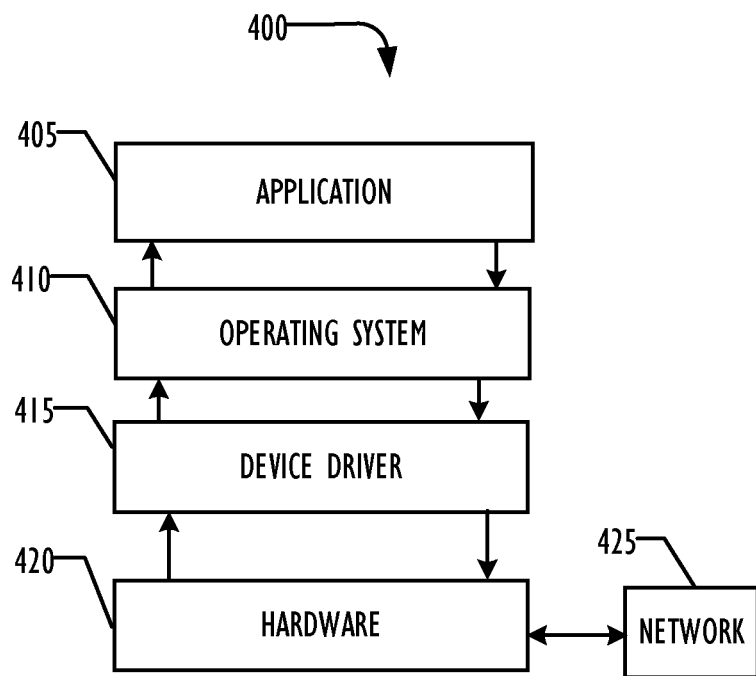
FIG. 4 illustrates block diagrams 400 and 450 representing logical layers of a computer processing device and a computer processing device configured to intercept encryption information (e.g., keys or decrypted data), according to one or more disclosed embodiments.
Figure 4:
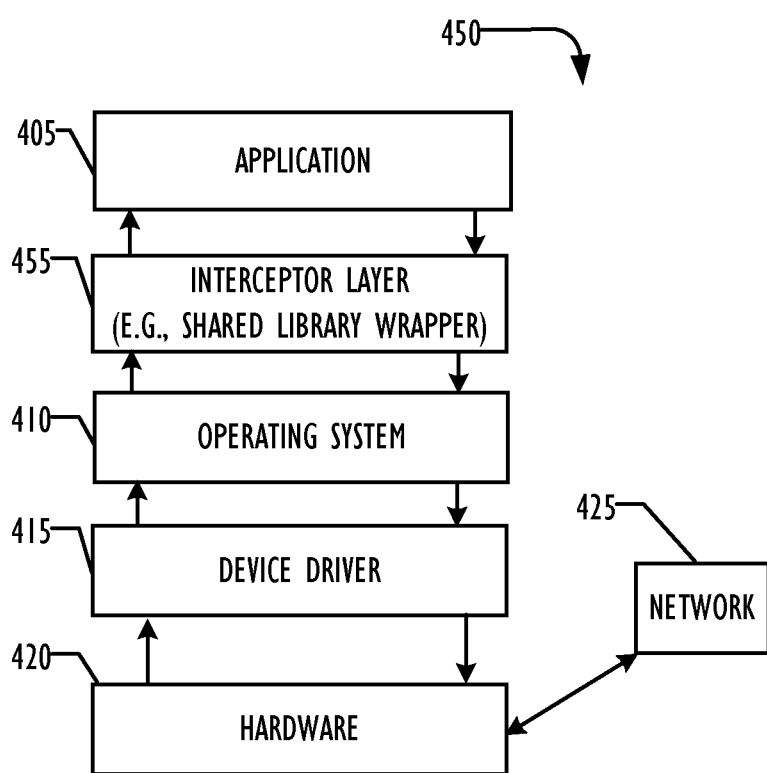

FIG. 4 illustrates block diagrams 400 and 450 representing logical layers of a computer processing device and a computer processing device configured to intercept encryption information (e.g., keys or decrypted data), according to one or more disclosed embodiments. FIG. 4 shows two block diagrams (400 and 450) illustrating examples of a hardware and software stack, each in the form of a layered model, for use in explaining some methods of implementing interception or replacement function hooks. Replacement functions may be useful to alter functioning of a particular library, e.g., to intercept information, without altering additional portions of an already configured system Block diagram 400 includes layers depicting interaction points between different functional components of a computer implemented solution. Application layer 405 is depicted at the top of the layered model to indicate that it is "closest" to the user with respect to functionality. In typical operation, a user interacts with an application (as supported by the operating system) to introduce commands (e.g., command line inputs or graphical user interface selections) for execution where the execution begins at application layer 405. The application, in turn, sends and receives commands and information to operating system layer 410. Operating system layer 410, as shown, sits between application layer 405 and device driver layer 415.

Device driver layer 415 provides the interface between operating system layer 405 and hardware components represented by hardware layer 420. Hardware components may include input devices such as keyboards and mice for receiving user input, output devices such as traditional monitors and speakers, and input/output devices such as touch screen monitors, network interfaces (to communicate via network 425), disk controller cards, memory devices, etc.

The layered model shown in block diagram 400 represents a traditional logical representation of a software/hardware stack and may not be totally accurate for all implementations. For example, some portions of device drivers may more accurately reside within operating system layer 410 depending on how the operating system was implemented. In any case, block diagram 400 represents a conceptual model of how different components of a processing device may be configured to support application execution.

As further illustrated in block diagram 400, network 425 (which may include any of networks 130 or 135) may be used to communicatively couple processing devices to each other. In this example, API calls and key interception logic may be implemented at different layers of the model. For example, the hardware could be modified to provide additional events directed to an intercepting infrastructure along with traditionally supplied events. Similarly, the device driver or operating system may be modified to include additional functionality directed to support disclosed embodiments of API monitoring and analysis.

Finally, each application may be adapted to include additional logic to support disclosed embodiments of API monitoring and analysis. While all of these implementations are possible, they represent varying degrees of "cost" in both development time and possible processing device performance. Accordingly, some combination of alterations at different layers may be desirable. Further, an example implementation of monitoring capabilities potentially requiring no changes to other layers is illustrated by block diagram 450 discussed below. Embodiments may include combinations of the disclosed possible implementations.

Continuing with FIG. 4, block diagram 450 illustrates a variation to the layered model explained above. In particular, block diagram 450 includes interceptor layer 455 implemented between application layer 405 and operating system layer 410. Introduction of interceptor layer 455, as illustrated, may represent an embodiment where minimal changes (if any) are required at other layers of the model. It may even be possible to implement intercepting layer 455 without application layer 405 or operating system layer 410 having to change their method of operation with adjacent layers of the model. Intercepting layer 455 could be configured to identify any pertinent interactions (e.g., handshakes to initialize or change encryption keys on a session)

between application layer 405 and operating system layer 410 (in this example it is considered that OpenSSL 310 and web server 330 execute at application layer 405). All other interactions would "pass through" intercepting layer 455 unaffected. For any pertinent interactions, intercepting layer 455 could initiate transmission of intercepted information via network 130 or secure secondary communication path from SSLAGENT 151 (implemented in intercepting layer 455) to NSP 105. Once received at NSP 105 key information may be used as described herein.

Figure 5:
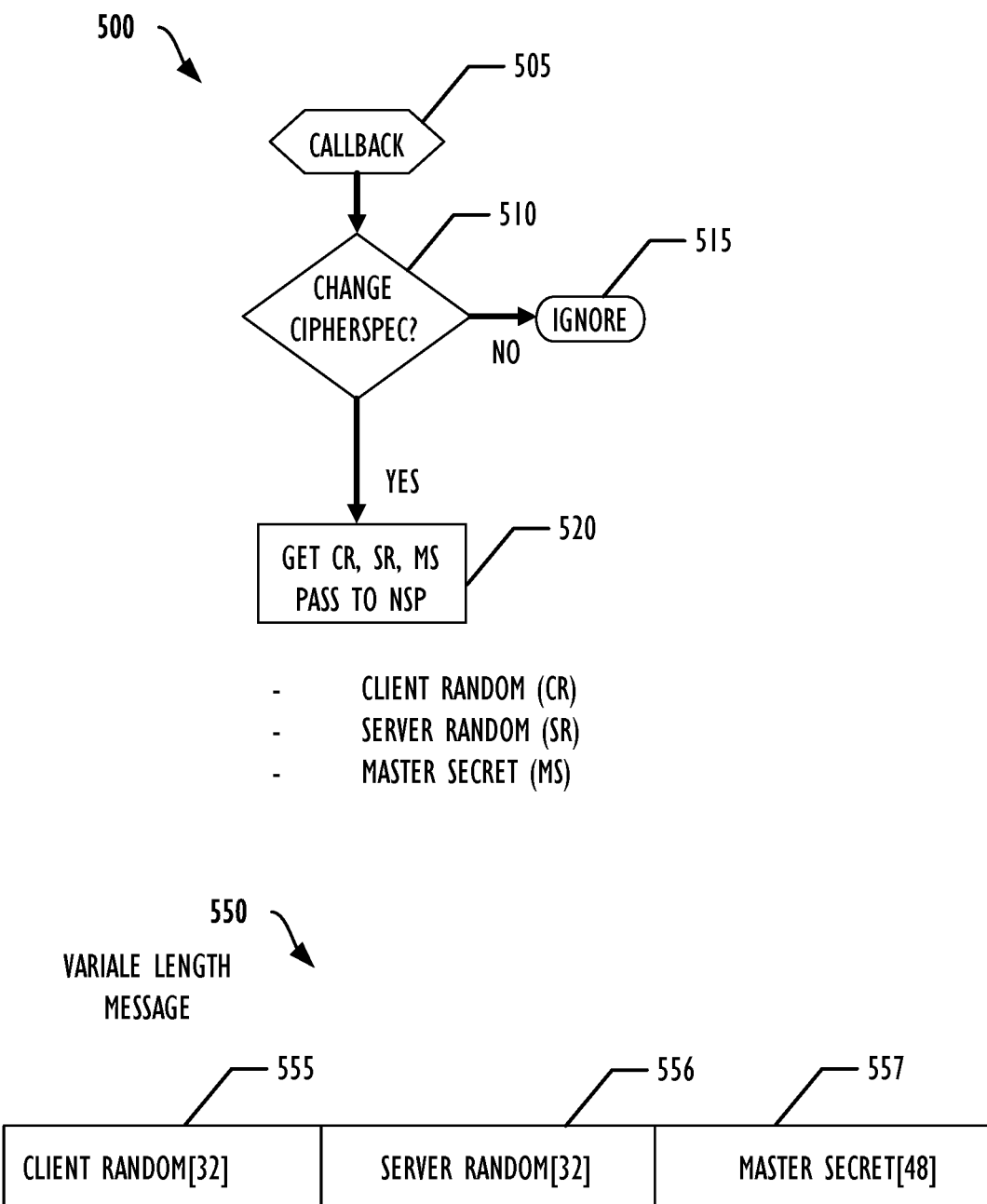
FIG. 5 illustrates a flowchart 500 representation of a callback that may be used to intercept and transfer encryption key information for encryption technologies that utilize ephemeral keys, according to one or more disclosed embodiments.

FIG. 5 illustrates a flowchart 500 representation of a callback that may be used to intercept and transfer encryption key information for encryption technologies that utilize ephemeral keys, according to one or more disclosed embodiments. Beginning at block 505 a callback is received from a module or subsystem that may be part of intercepting layer 455 for example. The callback may be invoked automatically every time a portion of OpenSSL, for example, is invoked. Once invoked, decision 510 indicates that the code initiated in the call back could determine if a ChangeCiperSpec function has been invoked to change encryption information. If so, the YES prong of decision 510, flow continues to block 520 where pertinent information required for a specific implementation of the disclosed one or more embodiments on a sensor (e.g., NSP 105) may be obtained and passed to the sensor, for example using a secure secondary communication path from web server 150 to NSP 105. If it is not a ChangeCiperSpec condition, the NO prong of decision 510, flow can simply continue to block 515 and be ignored because it is not considered pertinent.

FIG. 5 also includes an example of a variable length message 550 that contains client random 555, server random 556, and master secret 557. As discussed above, a variable length message such as variable length message 555 may be shared between a sensor and a web server each time encryption information is negotiated or later changed. In some implementations, the variable length message may be padded so that it is a consistent size (e.g., 128 bytes). The variable length message may be shared between devices using a secure secondary communication path, for example.

Figure 6:
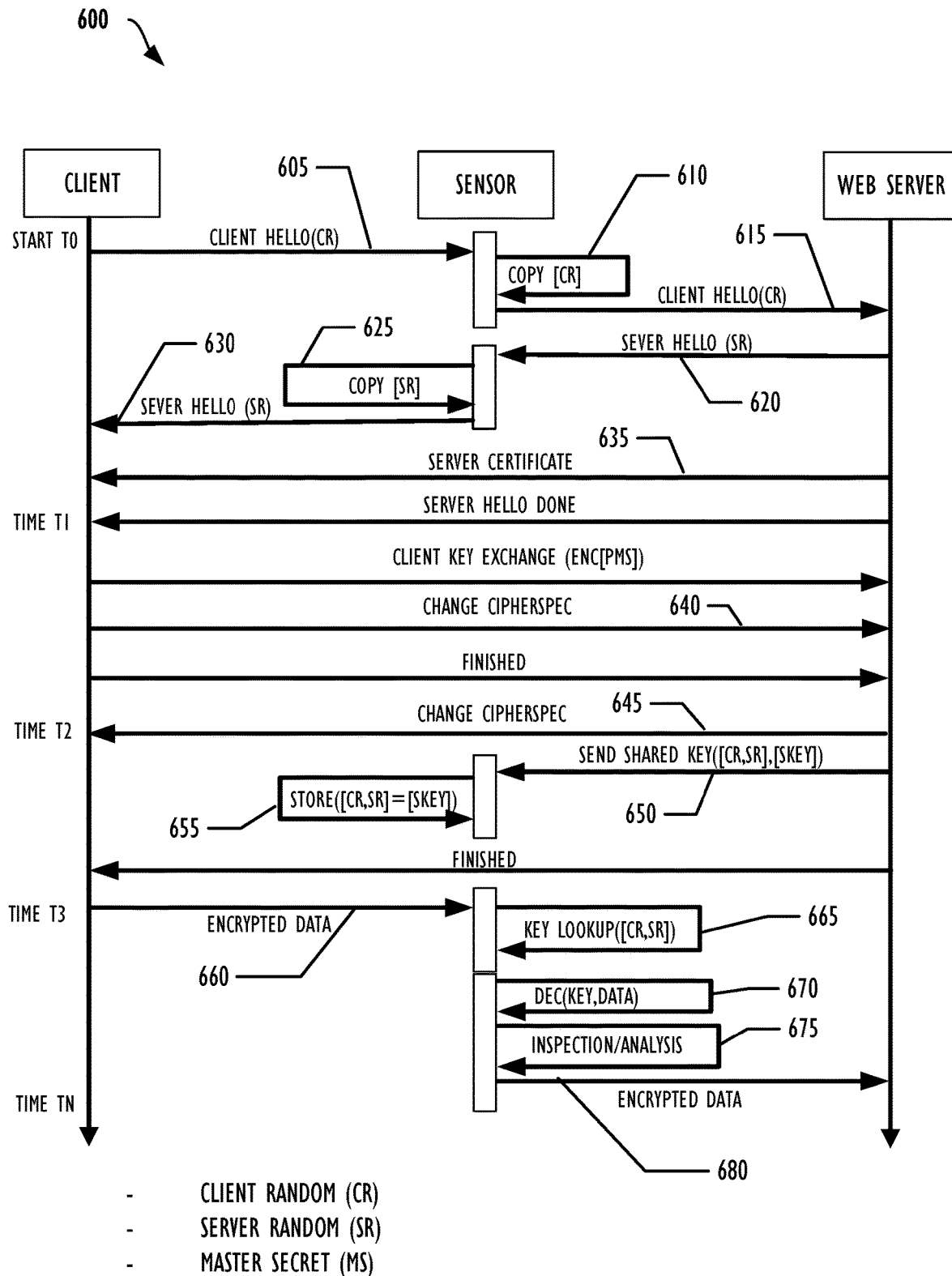
FIG. 6 illustrates a timeline 600 of message and information flow between a client, sensor (e.g., NSP), and web server, according to one or more disclosed embodiments.

FIG. 6 illustrates a timeline 600 of message and information flow between a client, sensor (e.g., NSP), and web server, according to one or more disclosed embodiments. This is just one example timeline sequence that may occur. In a real-world implementation, variations on this timeline are expected and still conform to the concepts of this disclosure. Further, a single implementation of an NSP (e.g., sensor) and SSLKeyServer (e.g., web server) may support many different variations of this timeline based on activities initiated by different client devices (e.g., processors executing a web browser, or web services client application). Time line 700 illustrates time beginning at time T0 at the top with events progressing in temporal order as you go down the page. Information exchange is shown left to right and right to left. Time line 700 illustrates an example interchange between client and server, via a sensor (NSP) as already discussed above and is provided here to further illustrate (e.g., pictorially) the above discussions. In this example, beginning at time T0, a client initiates a connection request with a Client Hello 605. The Sensor copies the client random 610 for later use and sends the client hello 615 on to the server. The server responds with server hello 620, via the sensor (in part because that is who sent the server the message), to the client. While passing through the sensor a copy 625 of the server random from server hello 630 is made for future use. Next the Server certificate 635 and server hello done are sent to the client (now at T1). These messages may be sent directly, or may simply pass through the sensor, depending on the implementation. Next, the client may send a client key exchange (e.g., an encrypted Private Master Secret (PMS)) to the server. This may happen at the initial handshake that establishes a session or at any time a key is changed. As shown in this example, three messages (Client Key Exchange, ChangeCipherSpec 640, and Finished) are sent from the client to the server. The server acknowledges the three messages with a ChangeCiperSpec response 645 at time T2. Next, the server sends 650 the shared key (including the current client random (CR) and server random (SR)), via the sensor which makes a copy 655, to the client. This act may represent the SSLAGENT 151 library having intercepted information, as discussed above, and providing it to the sensor. Because the information has just previously been sent to the client it is the sensor that needs this possibly and likely changed information to remain able to decrypt communications for this session. Once the ChangeCipherSpec exchange is completed as indicated by the Finished communication from the server to the client, time progresses to T3 where encrypted data 660 may flow on the session from the client to the web server. As each message of potentially encrypted data is received at the sensor, a key lookup 665, decryption 670 and inspection 675, may be performed prior to passing the (original) encrypted data 680 to the web server.

In general, Cipher/Cipher suite support can be broadly categorized into two types of support functions: Key exchange/key algorithm support and symmetric cipher support. In some disclosed embodiments, a sensor such as NSP 105 plays a transparent role in either key exchange or key generation. That is, NSP 105 is reliant on an end server host to share the keys and hence the support for algorithms depends on what the end server supports. Nevertheless, the approach may be designed in such a way that multiple algorithms may be supported and include, but are not limited to:

RSA
DH(E)
ECDH(E)

In an approach where a sensor such as NSP 105 is configured to perform an active role in decrypting the application records using a symmetric cipher agreed upon during a handshake, at least the following symmetric ciphers may be configured to work:

NULL
ARC4
DES/CBC
3DES/CBC
AES(CBC/GCM)

Figure 7:
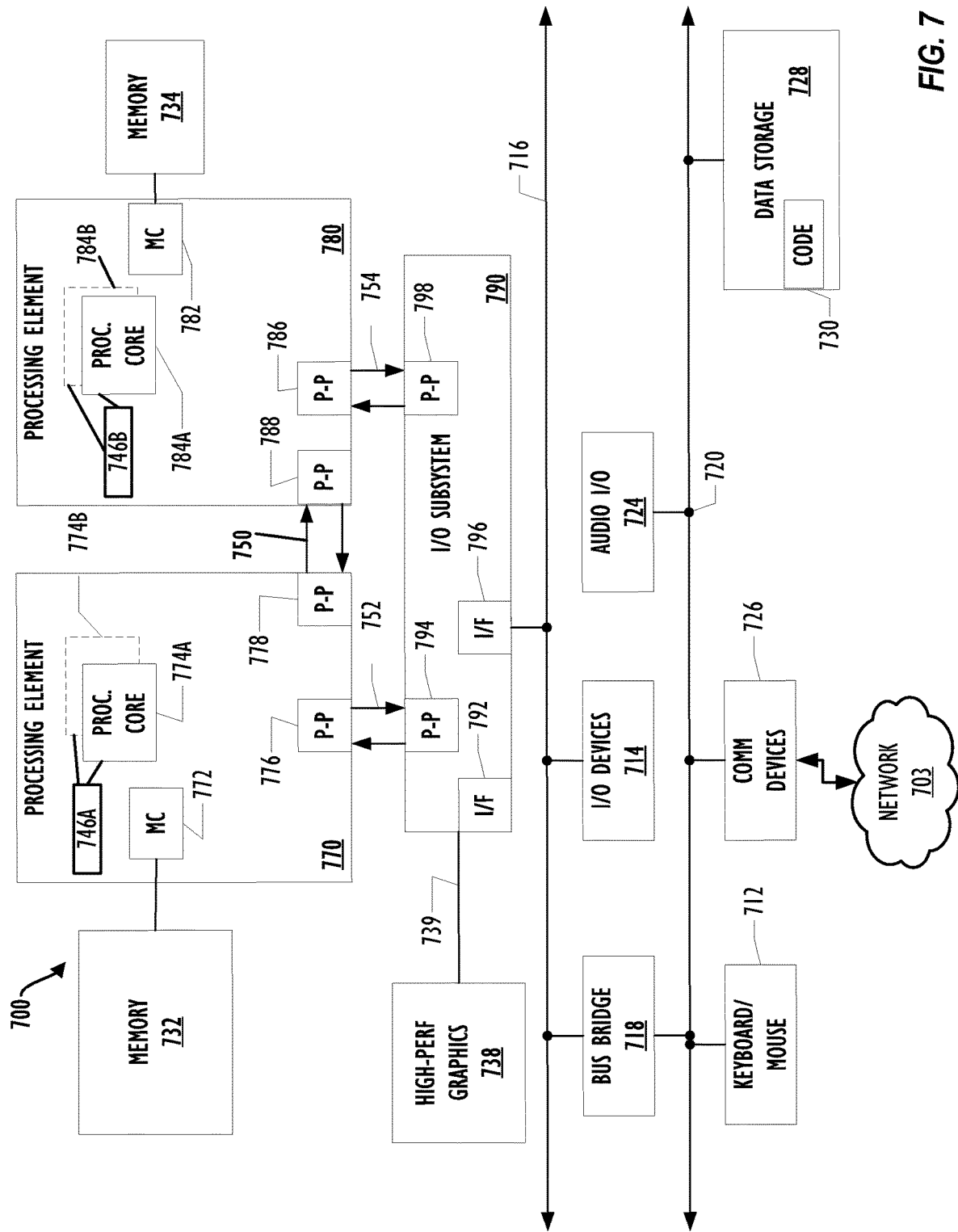
FIG. 7 is a block diagram illustrating a processing device (e.g. programmable device 700) for use with techniques described herein according to one or more embodiments.

Referring now to FIG. 7, a block diagram illustrates a programmable device 700 that may be used within a network device, such as devices NSP 105 or web server 150, in accordance with one or more embodiments. Devices may not include all of the elements of FIG. 7. The programmable device 700 illustrated in FIG. 7 is a multiprocessor programmable device that includes a first processing element 770 and a second processing element 780. While two processing elements 770 and 780 are shown, an embodiment of programmable device 700 may also include only one such processing element. Programmable device 700 is illustrated as a point-to-point interconnect system, in which the first processing element 770 and second processing element 780 are coupled via a point-to-point interconnect 750. Any or all of the interconnects illustrated in FIG. 7 may be implemented as a multi-drop bus rather than point-to-point interconnects.

As illustrated in FIG. 7, each of processing elements 770 and 780 may be multicore processors, including first and second processor cores (i.e., processor cores 774a and 774b and processor cores 784a and 784b). Such cores 774a, 774b, 784a, 784b may be configured to execute instruction code in a manner similar to that discussed above in connection with FIGS. 1-6. However, other embodiments may use processing elements that are single core processors as desired. In embodiments with multiple processing elements 770, 780, each processing element may be implemented with different numbers of cores as desired.

Each processing element 770, 780 may include at least one shared cache 746a or 746b, respectively. The shared cache 746a, 746b may store data (e.g., instructions) that are utilized by one or more components of the corresponding processing element, such as the cores 774a, 774b and 784a, 784b, respectively. For example, the shared cache may locally cache data stored in a memory 732, 734 for faster access by components of the processing elements 770, 780. In one or more embodiments, the shared cache 746a, 746b may include one or more mid-level caches, such as level 2 (L2), level 3 (L3), level 4 (L4), or other levels of cache, a last level cache (LLC), or combinations thereof.

While FIG. 7 illustrates a programmable device with two processing elements 770, 780 for clarity of the drawing, the scope of the present invention is not so limited and any number of processing elements may be present. Alternatively, one or more of processing elements 770, 780 may be an element other than a processor, such as an graphics processing unit (GPU), a digital signal processing (DSP) unit, a field programmable gate array, or any other programmable processing element. Processing element 780 may be heterogeneous or asymmetric to processing element 770. There may be a variety of differences between processing elements 770, 780 in terms of a spectrum of metrics of merit including architectural, microarchitectural, thermal, power consumption characteristics, and the like. These differences may effectively manifest themselves as asymmetry and heterogeneity amongst processing elements 770, 780. In some embodiments, the various processing elements 770, 780 may reside in the same die package.

First processing element 770 may further include memory controller logic (MC) 772 and point-to-point (P-P) interconnects 776 and 778. Similarly, second processing element 780 may include a MC 782 and P-P interconnects 786 and 788. As illustrated in FIG. 7, MCs 772 and 782 couple processing elements 770 and 780 to respective memories, namely a memory 732 and a memory 734, which may be portions of main memory locally attached to the respective processors. While MC logic 772 and 782 is illustrated as integrated into processing elements 770 and 780, in some embodiments the memory controller logic may be discrete logic outside processing elements 770, 780 rather than integrated therein.

Processing element 770 and processing element 780 may be coupled to an I/O subsystem 790 via respective P-P interconnects 776 and 786 through links 752 and 754. As illustrated in FIG. 7, I/O subsystem 790 includes P-P interconnects 794 and 798. Furthermore, I/O subsystem 790 includes an interface 792 to couple I/O subsystem 790 with a high performance graphics engine 738. In one embodiment, a bus (not shown) may be used to couple graphics engine 738 to I/O subsystem 790. Alternately, a point-to-point interconnect 739 may couple these components.

In turn, I/O subsystem 790 may be coupled to a first link 716 via an interface 796. In one embodiment, first link 716 may be a Peripheral Component Interconnect (PCI) bus, or a bus such as a PCI Express bus or another I/O interconnect bus, although the scope of the present invention is not so limited.

As illustrated in FIG. 7 various I/O devices 714, 724 may be coupled to first link 716, along with a bridge 718 which may couple first link 716 to a second link 720. In one embodiment, second link 720 may be a low pin count (LPC) bus. Various devices may be coupled to second link 720 including, for example, a keyboard/mouse 712, communication device(s) 726 (which may in turn be in communication with the computer network 703), and a data storage unit 728 such as a disk drive or other mass storage device which may include code 730, in one embodiment. The code 730 may include instructions for performing embodiments of one or more of the techniques described above. Further, an audio I/O 724 may be coupled to second bus 720.

Note that other embodiments are contemplated. For example, instead of the point-to-point architecture of FIG. 7, a system may implement a multi-drop bus or another such communication topology. Although links 716 and 720 are illustrated as busses in FIG. 7, any desired type of link may be used. Also, the elements of FIG. 7 may alternatively be partitioned using more or fewer integrated chips than illustrated in FIG. 7.

Figure 8:
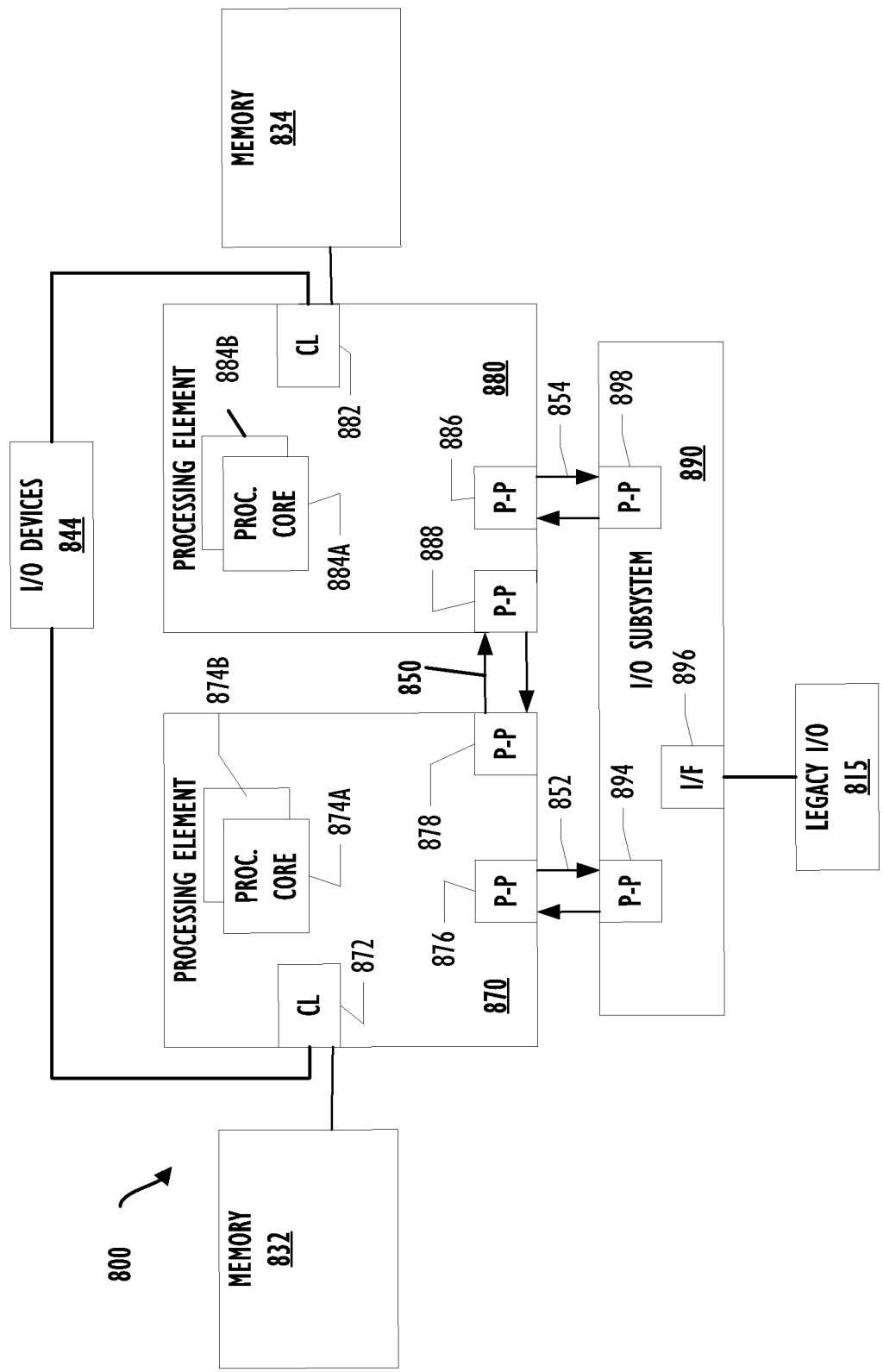
FIG. 8 is a block diagram illustrating a computing device (e.g., programmable device 800) communicatively coupled to a network for use with techniques described herein for one or more embodiments.

Referring now to FIG. 8, a block diagram illustrates a programmable device 800 according to another embodiment. Certain aspects of FIG. 7 have been omitted from FIG. 8 in order to avoid obscuring other aspects of FIG. 8.

FIG. 8 illustrates that processing elements 870 and 880 may include integrated memory and I/O control logic ("CL") 872 and 882, respectively. In some embodiments, the 872, 882 may include memory control logic (MC) such as that described above in connection with FIG. 7. In addition, CL 872, 882 may also include I/O control logic. FIG. 8 illustrates that not only may the memories 832, 834 be coupled to the 872, 882, but also that I/O devices 844 may also be coupled to the control logic 872, 882. Legacy I/O devices 815 may be coupled to the I/O subsystem 890 by interface 896. Each processing element 870, 880 may include multiple processor cores, illustrated in FIG. 8 as processor cores 874A, 874B, 884A, and 884B. As illustrated in FIG. 8, I/O subsystem 890 includes P-P interconnects 894 and 898 that connect to P-P interconnects 876 and 886 of the processing elements 870 and 880 with links 852 and 854. Processing elements 870 and 880 may also be interconnected by link 850 and interconnects 878 and 888, respectively.

The programmable devices depicted in FIGS. 7 and 8 are schematic illustrations of embodiments of programmable devices which may be utilized to implement various embodiments discussed herein. Various components of the programmable devices depicted in FIGS. 7 and 8 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

EXAMPLES

The following examples pertain to further embodiments.

One example is a method of analyzing encrypted network traffic on a sensor device located in a network communication path between a client device and a server device, the method includes: detecting, at the sensor device, a client initiated hello message sent from the client device to the server device; copying first information from the client hello message to, in part, track a session initiation handshake, wherein the client hello message is a first message of the handshake; sending the client hello message to the server device; detecting, at the sensor device, a response to the client hello in a server hello message sent from the server device to the client device; copying second information from the server hello message to, in part, track the session initiation handshake; detecting, at the sensor device, a negotiation of encryption key information for the session; storing third information from the negotiation; detecting, at the sensor device, encrypted data message information sent from the client device to the server device as part of the session; and using the first, second, and third information to analyze the encrypted data message information.

Example 1 may be extended to include the third information representing encryption keys negotiated for the session which may represent a Transport Layer Security (TLS) communication on a transmission control protocol (TCP) session. Example 1 may alternatively include wherein the first and second information represent information used to uniquely identify at least one encryption key data stored in a memory of the sensor device for a plurality of session concurrently active on the sensor device. Example 1 may further include monitoring the session to identify a change in encryption keys and updating the at least one encryption key data stored in the memory of the sensor device. In some cases, monitoring the session includes detecting, at the sensor device, a ChangeCipherSpec communication between the client device and the server device. Example 1 may also include fourth information sent from the server device to the sensor device via a secure secondary communication path in addition to data sent via the session and the fourth information may include data from the session already decrypted at the server device. Additionally, the fourth information may include encryption key information regarding the session previously negotiated at the server device. In some cases the secure secondary communication path uses a non-network communication path between the server device and the sensor device. The secure secondary communication path may use an independent and secure additional network communication path between the server device and the sensor device. Example 1 may be implemented wherein the independent and secure additional network communication path comprises a virtual private network or a separate physical network. Example 1 may be implemented, in part, using a non-transitory computer readable medium including instructions stored thereon, that when executed by one or more processors cause the one or more processors to perform, or assist in performing, one of the above described examples. Also an apparatus, such as NSP 105, may be configured to perform any of the above examples, in whole or in part.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method of analyzing encrypted network traffic on a sensor device located in a network communication path between a client device and a server device, the method comprising:

detecting, at the sensor device, a client initiated hello message sent from the client device to the server device;

copying first information from the client initiated hello message to, in part, track a session initiation handshake of a session, wherein the client initiated hello message is a first message of the handshake;

sending the client initiated hello message to the server device;

detecting, at the sensor device, a response to the client initiated hello in a server hello message sent from the server device to the client device;

copying second information from the server hello message to, in part, track the session initiation handshake, wherein the first and second information represent information used to uniquely identify at least one encryption key data stored in a memory of the sensor device for a plurality of sessions concurrently active on the sensor device;

detecting, at the sensor device, a negotiation of encryption key information for the session;

storing third information from the negotiation;

detecting, at the sensor device, encrypted data message information sent from the client device to the server device as part of the session; and using the first, second, and third information to analyze the encrypted data message information.

2. The method of claim 1, wherein the third information represents encryption keys negotiated for the session.

3. The method of claim 1, wherein the session represents a Transport Layer Security (TLS) communication on a transmission control protocol (TCP) session.

4. The method of claim 1, further comprising:

monitoring the session to identify a change in encryption keys and updating the at least one encryption key data stored in the memory of the sensor device.

5. The method of claim 4, wherein monitoring the session comprises detecting, at the sensor device, a ChangeCipherSpec communication between the client device and the server device.

6. The method of claim 1, wherein fourth information is sent from the server device to the sensor device via a secure secondary communication path in addition to data sent via the session.

7. The method of claim 6, wherein the fourth information includes data from the session already decrypted at the server device.

8. The method of claim 6, wherein the fourth information includes encryption key information regarding the session previously negotiated at the server device.

9. The method of claim 6, wherein the secure secondary communication path uses an independent and secure additional network communication path between the server device and the sensor device.

10. The method of claim 9, wherein the independent and secure additional network communication path comprises a virtual private network or a separate physical network.

11. A method of analyzing encrypted network traffic on a sensor device located in a network communication path between a client device and a server device, the method comprising:
   detecting, at the sensor device, a client initiated hello message sent from the client device to the server device;
   copying first information from the client initiated hello message to, in part, track a session initiation handshake of a session, wherein the client initiated hello message is a first message of the handshake;
   sending the client initiated hello message to the server device;
   detecting, at the sensor device, a response to the client initiated hello in a server hello message sent from the server device to the client device;
   copying second information from the server hello message to, in part, track the session initiation handshake;
   detecting, at the sensor device, a negotiation of encryption key information for the session;
   storing third information from the negotiation;
   detecting, at the sensor device, encrypted data message information sent from the client device to the server device as part of the session; and
   using the first, second, and third information to analyze the encrypted data message information, wherein fourth information is sent from the server device to the sensor device via a secure secondary communication path in addition to data sent via the session, wherein the secure secondary communication path uses a non-network communication path between the server device and the sensor device.

12. A non-transitory computer readable medium comprising instructions stored thereon, that when executed by one or more processors cause the one or more processors to:
   detect, at a sensor device, a client initiated hello message sent from a client device to a server device;
   copy first information from the client initiated hello message to, in part, track a session initiation handshake of a session, wherein the client initiated hello message is a first message of the handshake;
   send the client initiated hello message to the server device;
   detect, at the sensor device, a response to the client initiated hello message in a server hello message sent from the server device to the client device;
   copy second information from the server hello message to, in part, track the session initiation handshake;
   detect, at the sensor device, a negotiation of encryption key information for the session;
   store third information from the negotiation;
   detect, at the sensor device, encrypted data message information sent from the client device to the server device as part of the session; and
   use the first, second, and third information to analyze the encrypted data message information, wherein fourth information representing information used to uniquely identify at least one encryption key data stored in a memory of the sensor device for a plurality of session concurrently active on the sensor device is received from the server device at the sensor device via a secure secondary communication path in addition to data sent via the session.

13. The non-transitory computer readable medium of claim 12, wherein the third information represents encryption keys negotiated for the session.

14. A sensor device comprising:
   one or more processing units;
   a memory communicatively coupled to the one or more processing units;
   a network interface communicatively coupled to the memory and the one or more processing units; and
   a secondary communication interface communicatively coupled to the memory and the one or more processing units, wherein the memory stores instructions that when executed by the one or more processing units cause the one or more processing units to:
      detect, at the sensor device, a client initiated hello message from a client device to a server device, the client initiated hello message sent over a network accessible by the network interface;
      copy first information from the client initiated hello message to, in part, track a session initiation handshake of a session, wherein the client initiated hello message is a first message of the handshake;
      send the client initiated hello message, via the network interface, to the server device;
      detect, at the sensor device, a response to the client initiated hello message in a server hello message sent from the server device to the client device;
      copy second information from the server hello message to, in part, track the session initiation handshake;
      detect, at the sensor device, a negotiation of encryption key information for the session;
      store third information from the negotiation, wherein the first and second information represent information used to uniquely identify at least one encryption key data stored in a memory of the sensor device for a plurality of session concurrently active on the sensor device and the third information represents encryption keys negotiated for the session;
      detect, at the sensor device, encrypted data message information sent from the client device to the server device as part of the session; and
      use the first, second, and third information to analyze, using the one or more processing units, the encrypted data message information.

15. The sensor device of claim 14, wherein the instructions further cause the one or more processing units to:
   monitor the session to identify a change in encryption keys and update the at least one encryption key data stored in the memory of the sensor device.

16. The sensor device of claim 14, wherein fourth information is sent from the server device to the sensor device via a secure secondary communication path in addition to data sent via the session.

17. The sensor device of claim 14, wherein the third information represents encryption keys negotiated for the session and the third information is received at the sensor device from the server device via a secure secondary communication path using the secondary communication interface.

* * * * *